United States Patent [19]

Aleem et al.

[11] Patent Number: 4,517,479
[45] Date of Patent: May 14, 1985

[54] GENERATOR ARMATURE COOLING AND AIR GAP SEALING SYSTEM

[75] Inventors: Mohd A. Aleem, Roscoe; Alexander Krinickas, Jr., Rockford, both of Ill.

[73] Assignee: Sundstrand Corporation, Rockford, Ill.

[21] Appl. No.: 548,945

[22] Filed: Nov. 7, 1983

[51] Int. Cl.³ ............................................. H02K 9/00
[52] U.S. Cl. ...................................... 310/54; 310/45; 310/85; 310/260
[58] Field of Search ............... 310/52, 54, 57, 58, 310/59, 60 R, 64, 65, 43, 45, 260, 91, 86, 85, 88; 277/59, 80, 57

[56] References Cited

U.S. PATENT DOCUMENTS

| | | |
|---|---|---|
| 2,306,724 | 12/1942 | Gouldthorpe . |
| 2,334,976 | 11/1943 | Winther . |
| 2,587,077 | 2/1952 | Winther . |
| 3,075,103 | 1/1963 | Ward .................................. 310/54 |
| 3,271,600 | 9/1966 | Philofsky ............................ 310/55 |
| 3,365,600 | 1/1968 | Penn .................................. 310/260 |
| 3,517,231 | 6/1970 | Massar ............................... 310/52 |
| 3,609,420 | 9/1971 | Inagaki .............................. 310/54 |
| 3,634,705 | 1/1972 | Fidei ................................. 310/57 |
| 3,648,085 | 3/1972 | Fujii ................................. 310/54 |
| 3,663,848 | 5/1972 | Lehoczky ........................... 310/57 |
| 3,740,595 | 6/1973 | Heller et al. ........................ 310/54 |
| 3,968,388 | 7/1976 | Lambrecht et al. .................. 310/54 |
| 3,975,655 | 8/1976 | Beermann .......................... 310/260 |
| 3,995,181 | 11/1976 | Suit .................................. 310/58 |

FOREIGN PATENT DOCUMENTS

| | | |
|---|---|---|
| 1097019 | 1/1961 | Fed. Rep. of Germany ........ 310/65 |
| 54-126903 | 10/1979 | Japan ................................ 310/260 |

*Primary Examiner*—R. Skudy
*Attorney, Agent, or Firm*—Wood, Dalton, Phillips, Mason & Rowe

[57] ABSTRACT

A rotary electric machine including a housing having a stator. The stator includes an armature winding with end turns extending from opposite ends thereof. A rotor is journalled within the housing and the stator and is separated from the stator by an air gap. At least two nozzles are located within the housing, one adjacent each end of the armature, and directed at an associated set of end turns. A pair of partitions are disposed within the housing, one for each end of the armature. Each partition is located axially outwardly of the associated end turns and nozzle. A first air gap seal includes a resilient gasket sealingly engaging a corresponding one of the partitions and the tips of the adjacent end turns while a second air gap seal includes sheet-like seals interposed between layers of the end turns.

8 Claims, 4 Drawing Figures

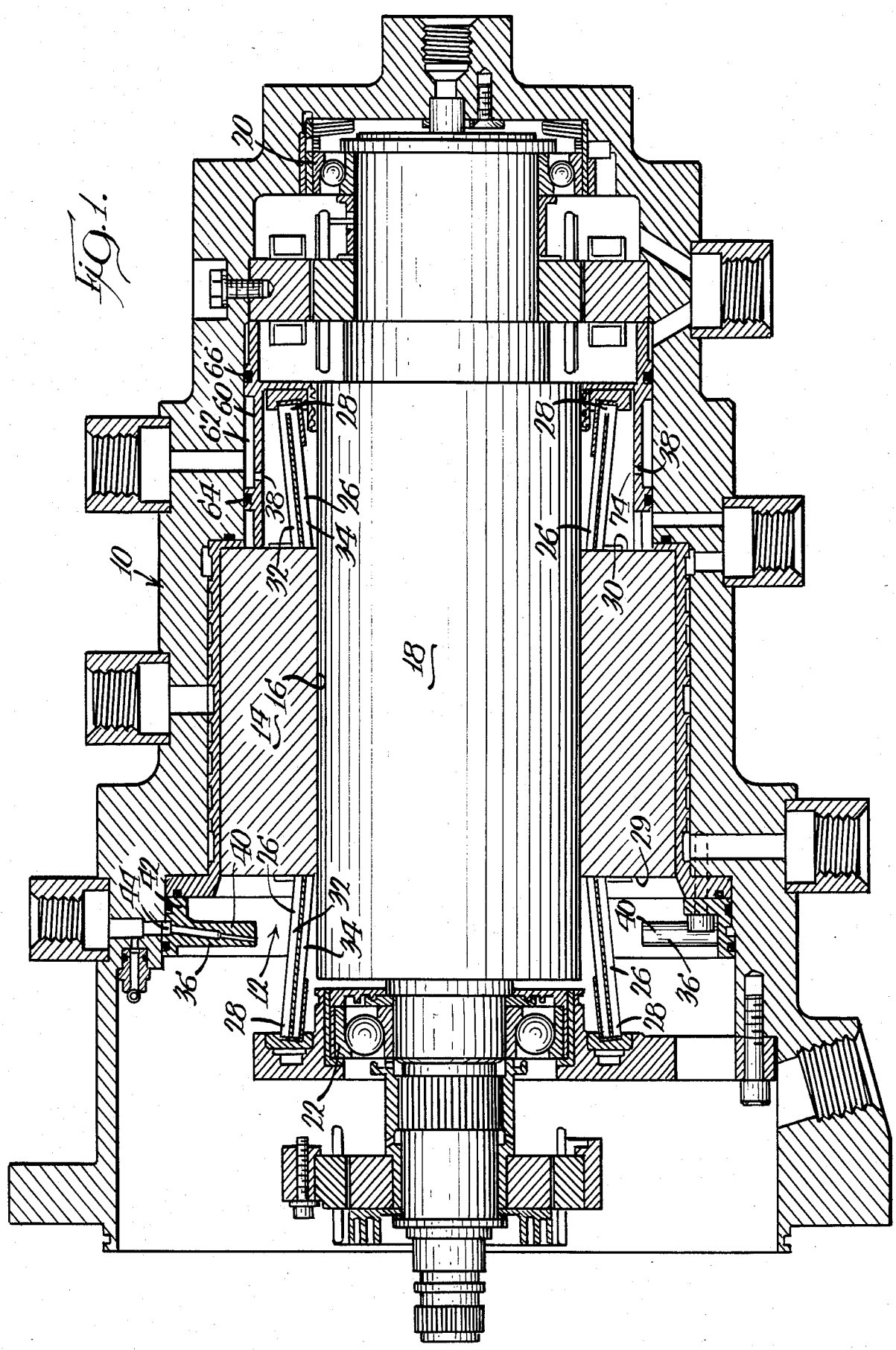

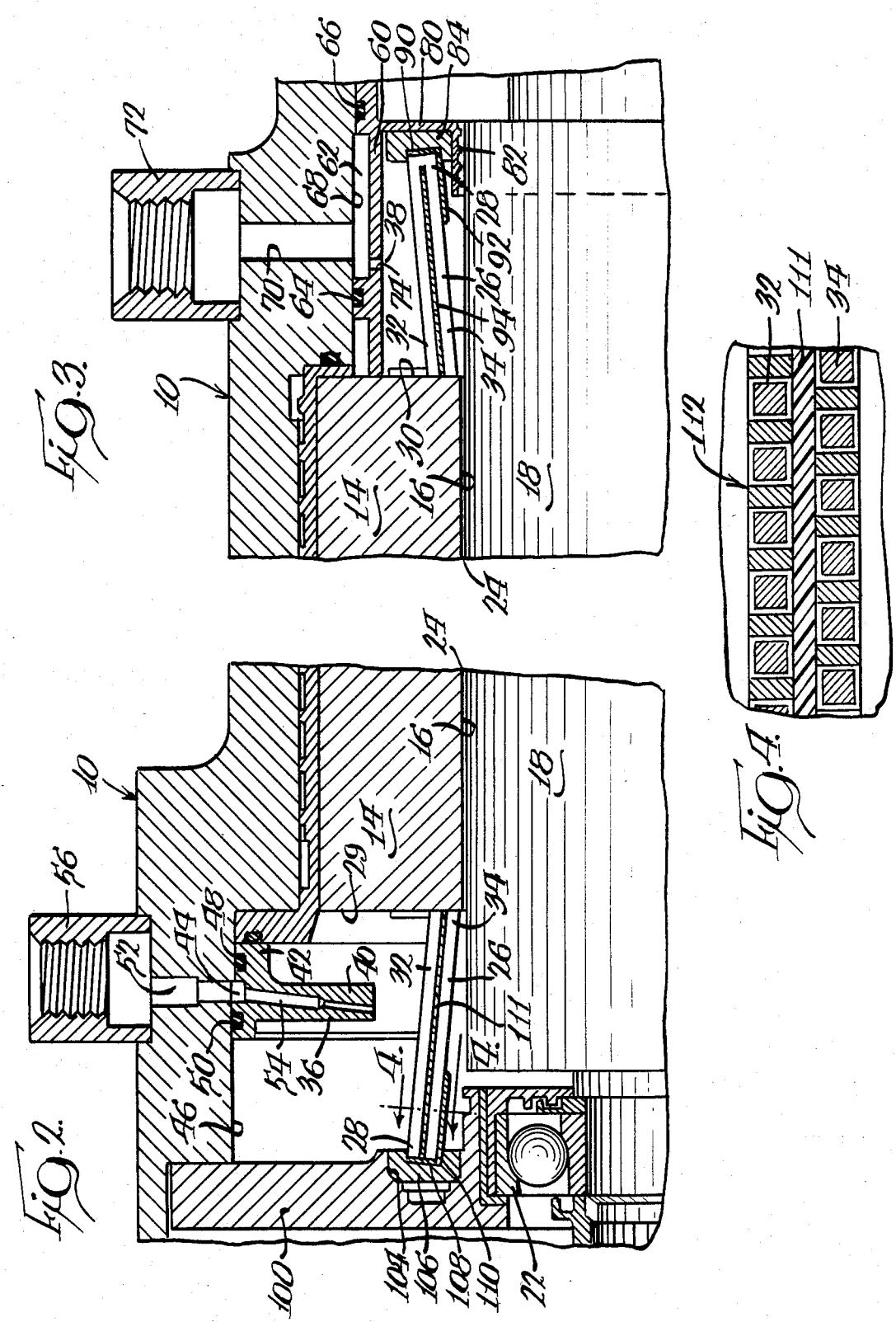

GENERATOR ARMATURE COOLING AND AIR GAP SEALING SYSTEM

DESCRIPTION

1. Technical Field

This invention relates to rotary electric machines and more particularly, to a system for cooling armature windings with a liquid coolant and for preventing the coolant from entering the stator-rotor air gap.

2. Background Art

It has long been recognized that the capacity of rotary electric machines such as motors and generators can be improved by appropriate cooling to dissipate the heat built up during operation which could otherwise deleteriously affect the machine. Thus there have evolved a variety of proposals for such cooling.

In some, machine windings such as armature windings are provided with hollow conductors through which a coolant is flowed for heat dissipation. One prior art patent representative of this approach is U.S. Pat. No. 3,634,705 issued Jan. 11, 1972 to Fidei.

Another approach employed is to spray or ot otherwise bathe the end turns of armature windings with a coolant. Such an approach is illustrated for example in U.S. Pat. Nos. 3,609,420 issued Sept. 28, 1971 to Inagaki et al and 3,648,085 issued Mar. 7, 1972 to Fujii.

While both approaches provide effective cooling of armature windings such that machine capacity can be increased, both are not without drawbacks. It is obviously expensive to form conduits in conductors for containing the coolant and the distribution of coolant to the hollow conductors is intricate and not well suited to small scale machines.

At the same time, the approach wherein winding end turns are sprayed has a disadvantage in that any coolant entering the air gap between the rotor and the stator will produce drag losses that may appreciably consume or even eliminate the additional capacity gained by liquid cooling. Inagaki attempts to avoid this difficulty by placing an insulating sleeve in the air gap and extending between stationary parts of the machien to preclude the coolant from entering the air gap. However, the introduction of the sleeve into the air gap increases the overall length of the gap which in turn decreases magnetic efficiency. Fujii appears to employ frusto-conical sleeves extending from opposite ends of the armature and radially inwardly of the end turns. While the Fujii sleeves do not enter the air gap between the the rotor and the armature, and thus do not decrease magnetic efficiency, they do not seal against other housing components with the result that a path for the travel of coolant to the air gap, though circuitous in nature, nonetheless exists giving rise to the possibility of the entry of coolant into the air gap with the resultant drag losses.

The present invention is directed to overcoming one or more of the above problems.

SUMMARY OF THE INVENTION

The invention is directed to a rotary electric machine including a housing having a stator comprised of an armature and windings including end turns extending from opposite ends of the armature. A rotor is journalled within the housing and the stator and separated from the stator by an air gap. At least two nozzles are located within the housing, one adjacent each end of the armature and directed at the associated end turns.

According to one feature of the invention, an air gap sealing means is provided which includes sheet-like seals interposed between layers of the end turns to intercept coolant and prevent its flow to the air gap.

According to another feature of the invention, a pair of partitions are located within the housing, one for each end of the armature. Each partition is located axially outwardly of the associated end turns and nozzles. Air gap sealing means including a resilient gasket sealingly engaging a corresponding one of the partitions and the tips of the adjacent end turns are provided.

Preferably, both features of the invention are embodied in a given rotary electric machine.

Desirably according to the invention, sheet-like seals are provided to engage and conform to the end turn tips and also engage the gasket to prevent irregularities in the end turn winding from producing leakage paths. Interstices between conductors forming the end turn tips may be filled with a plastic sealant such as epoxy.

Other objects and advantages of the invention will become apparent from the following specification taken in connection with the accompanying drawings.

BRIEF DESCRIPTION OF THE DRAWINGS

FIG. 1 is a sectional view of rotary electric machine, specifically a generator, embodying the invention;

FIG. 2 is an enlarged, fragmentary sectional view of the coolant and seal system of the invention as applied to the end turns on one side of the armature;

FIG. 3 is a view similar to FIG. 2 but illustrating the application of the invention to the end turns at the opposite side of the armature; and FIG. 4 is an enlarged, fragmentary sectional view taken approximately along the line 4—4 in FIG. 2.

BEST MODE FOR CARRYING OUT THE INVENTION

An exemplary embodiment of a rotary electric machine made according to the invention is illustrated in the drawings and with reference to FIG. 1 is seen to be in the form of a so-called brushless generator. The same includes a housing, generally designated 10 in which a stator, generally designated 12 is disposed. The stator 12 includes a core 14 having a central cylindrical opening 16 in which a rotor 18 is journalled as by bearings 20 and 22. As best seen in FIGS. 2 and 3, a small air gap 24 exists between the rotor 18 and the armature core 14.

The armature core 14 is provided with windings in the usual fashion. End turns 26 of the windings extend from opposite sides 29 and 30 of the core 14. The end turns 26 terminate in tips 28 which are loop-like in nature and which frequently present an irregular surface as is well known. The windings are also layered having radially inner and outer layers 32 and 34 respectively.

Means are provided for spraying a cooling liquid on the end turns 26. Such means include multiple nozzles 36 and 38, the nozzles 36 being employed to cool the end turns 26 extending from the side 29 of the core and the nozzles 38 being employed to spray the end turns 26 associated with the end 30 of the core 14. Although in some instances one of each of the nozzles 36 and 38 spray suffice, preferably, there are a plurality of each of the nozzles 36 and 38 in angularly spaced relation about the end turns 26.

In the case of the nozzles 36, the same are provided by radially inwardly directed projections 40 formed integrally on the radial inner surface of a ring 42. The ring 42 has a radially outwardly opening annular groove 44 in its radially outer surface facing an annular surface 46 forming part of the interior of the housing 10. A pair of seal receiving grooves 48 and 50 flank the annular groove 44 and seal against the surface 46. When the ring 42 is disposed within the housing as illustrated in FIGS. 1 and 2, the annular groove 44 is in alignment with a radial bore 52 formed in the housing 10 which serves as a coolant inlet.

Each of the nozzles 36, and specifically, the projection 40 forming the same includes an interior bore 54 which terminates at the radially inner end of the projection 40 to define a spray outlet and at the annular groove 44 to be in fluid communication therewith. Consequently, a coolant introduced into the inlet bore 52 via a fitting 56 will ultimately enter the annular groove 44 to flow about the periphery of the ring 42 to each of the nozzles 36 located thereon.

The nozzles 38 are also integrally formed in a ring in a nature of a sleeve-like fitting 60. An annular groove 62 is located in the radially outer surface of the ring 60 and is flanked by seal receiving grooves 64 and 66 to establish a seal against an annular surface 68 within the housing 10 as best shown in FIG. 3. A radial bore 70 extends from a fitting 72 through the housing 10 to be in alignment with the groove 62. Thus, coolant introduced into the fitting 72 may be flowed around the interior of the groove 62 in the ring 60. The nozzles 38 are formes by a series of radially directed bores extending through the ring 60 into fluid communication with the groove 62.

A radially inwardly directed web 80 formed integrally on the ring 60 serves as a partition within the housing 10 axially outwardly of the adjacent end turns 26 and nozzle 38. Preferably, the web 80 terminates in an axially directed flange 82 with a labyrinth sealing surface on its radially inner side. Abutted against the web 80 is an annular, resilient gasket 84. As can be seen in FIG. 3, the tips 28 of the end turns 26 are pressed into the gasket 84 so as to be sealingly engaged thereby. As alluded to earlier, not unfrequently the end turn tips will be somewhat irregular and in order to assure that such irregularities do not provide a flow path between the end turn tips 28 and the gasket 84, sheets of aramid based insulation may be placed thereon. For example, one sheet 90 may be placed on the axially outer ends of the end turn tips 28 while a second sheet 92 may be placed on the inner dimension of the end turn tips 28. The insulation sheets 90 and 92 serve as seals. A suitable material may be that commercially sold under the registered trademark NOMEX.

Additionally, to prevent leakage of the coolant fluid to the air gap 24 through the end turns 26 at locations other than at the tips 28, a sheet 94 of an aramid based insulation which also serves as a seal is preferably disposed between the inner and outer layers 34 and 32 of the end turn windings 26.

Turning now to FIG. 2, a partition 100 is disposed within the housing 10 axially outwardly of the end turns 26 emanating from the end 29 of the core 14 and the nozzles 36. The partition 100 includes an axially intwardly opening groove 104 which may receive an annular resilient gasket 106 having the same characteristics as the gasket 84. The end turn tips 28 are pressed into the gasket 106. Sheet-like seals in the form of aramid based insulation may be disposed at the axially outer surface and at the inner diameter of the end turn tips 28 as illustrated at 108 and 110 respectively. The sheets 109 and 110 function identically to the sheets 90 and 92. Similarly, a sheet 111 of aramid based insulation serving as a seal may be disposed between the outer and inner layers 32 and 34 of the end turns 26.

In order to positively assure sealing of the end turn tips 28, the windings at the tips 28 may be impregnated with a plastic sealant 112 as illustrated in FIG. 4. Epoxy resins are satisfactory for the purpose.

From the foregoing, it will be appreciated that the cooling and air gap sealing system of the invention provides sizable advantages over cooling systems heretofore known. The expense of forming conductors as conduits to contain coolant is avoided as is the limitation of such systems on size. Similarly, the air gap 24 may be made of extremely small size maximizing magnetic efficiency of the system. At the same time, paths for flow of the coolant to the air gap are positively sealed through the unique combination of sheets such as the sheets 94 and 111 and the gaskets 84 and 106. The use of the sheets 90 and 92 and 108 and 110 smooth out irregularities in the end turn tips to assure positive sealing against the gaskets 84 and 106. Thus, an inexpensive but positive sealing system is provided by the invention without sacrificing efficiency.

We claim:
1. A rotary electric machine comprising:
a housing;
a stator within said housing including an armature having a winding including layered end turns extending from opposite ends of the armature;
a rotor journalled within said housing and said stator and separated from said stator by an air gap;
at least two nozzles within said housing, one adjacent each end of said armature and directed at the associated end turns;
a pair of partitions within said housing, one for each end of said armature, each being located axially outwardly of the associated end turns and nozzle;
first air gap sealing means including a resilient gasket sealingly engaging a corresponding one of said partitions and the tips of adjacent end turns and sheet-like seals engaging and conforming to said end turn tips and engaging and gasket; and
second air gap sealing means including sheet-like seals interposed between layers of said end turns.

2. The rotary electric machine of claim 1 wherein spaces between conductors forming said end turn tips are filled with a plastic sealant.

3. The rotary electric machine of claim 1 wherein said housing includes a coolant inlet and one of said nozzles is integrally formed on a ring to open gradually inwardly thereof, and a groove in the radially outer periphery of said ring and in fluid communication with said one nozzle, said ring sealingly engaging an annular interior wall of said housing with said groove aligned with said coolant inlet.

4. The rotary electric machine of claim 1 wherein said sheet-like seals are formed of insulating material such as aramid.

5. The rotary electric machine of claim 1 wherein there are a plurality of said nozzles adjacent each end of said armature and located radially outwardly said end turns and directed thereat.

6. A rotary electric machine comprising
a housing;
a stator within said housing having a winding including layered end turns extending from opposite ends of the armature;

a rotor journalled within said housing and said stator and separated from said stator by an air gap;

at least two nozzles within said housing, one adjacent each end of said armature and directed at the associated end turns;

a pair of partitions within said housing, one for each end of said armature, each being located axially outwardly of the associated end turns and nozzle; and air gap sealing means including a resilient gasket sealingly engaging a corresponding one of said partitions and the tips of the adjacent end turns said end turn tips are impregnated with a plastic sealant.

7. The rotary electric machine of claim 6 wherein irregularities in said end turn tips are smoothed by sheet-like seals engaging said tips and said gasket.

8. The rotary electric machine of claim 6 wherein said end turn tips are pressed into said gasket.

* * * * *